United States Patent
Choi et al.

(10) Patent No.: US 10,764,510 B2
(45) Date of Patent: Sep. 1, 2020

(54) IMAGE CONVERSION DEVICE

(71) Applicants: Hyundai Motor Company, Seoul (KR); Kia Motors Corporation, Seoul (KR)

(72) Inventors: Jae Seob Choi, Gyeonggi-Do (KR); Joong Ryoul Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 145 days.

(21) Appl. No.: 15/668,128

(22) Filed: Aug. 3, 2017

(65) Prior Publication Data

US 2018/0324365 A1    Nov. 8, 2018

(30) Foreign Application Priority Data

May 8, 2017    (KR) .................... 10-2017-0057350

(51) Int. Cl.
 *H04N 5/262* (2006.01)
 *B60R 1/00* (2006.01)
 *G06K 9/00* (2006.01)

(52) U.S. Cl.
 CPC ............ *H04N 5/2628* (2013.01); *B60R 1/00* (2013.01); *G06K 9/00798* (2013.01); *B60R 2300/207* (2013.01); *B60R 2300/304* (2013.01); *B60R 2300/307* (2013.01); *B60R 2300/602* (2013.01); *B60R 2300/802* (2013.01); *G06K 9/00671* (2013.01); *G06K 9/00805* (2013.01)

(58) Field of Classification Search
 CPC ................................ H04N 5/2628; B60R 1/00
 See application file for complete search history.

(56) References Cited

U.S. PATENT DOCUMENTS

| | | | |
|---|---|---|---|
| 8,179,241 B2 | 5/2012 | Sakai et al. | |
| 2012/0154591 A1* | 6/2012 | Baur | B60R 1/00 348/148 |
| 2014/0333729 A1* | 11/2014 | Pflug | G06T 15/20 348/47 |
| 2016/0137126 A1* | 5/2016 | Fursich | B60R 1/00 348/38 |

FOREIGN PATENT DOCUMENTS

| | | |
|---|---|---|
| EP | 1 363 807 B1 | 5/2007 |
| KR | 10-2012-0069958 | 6/2012 |
| KR | 10-1449160 | 10/2014 |

\* cited by examiner

*Primary Examiner* — Girumsew Wendmagegn
(74) *Attorney, Agent, or Firm* — Mintz Levin Cohn Ferris Glovsky and Popeo, P.C.; Peter F. Corless

(57) ABSTRACT

An image conversion device is provided. The device includes a driving environment recognition unit that has a camera acquiring a base image of areas behind and to the side of a subject vehicle and a sensor sensing a driving environment behind and to the side of the subject vehicle. A display unit displays the base image and a navigation unit provides information regarding a location of the subject vehicle. A controller determines whether a blind spot is created in the driving environment based on information acquired from the driving environment recognition unit and the navigation unit, converts the base image into an image including the blind spot to generate the converted image, and operates the display unit to display the converted image.

23 Claims, 16 Drawing Sheets

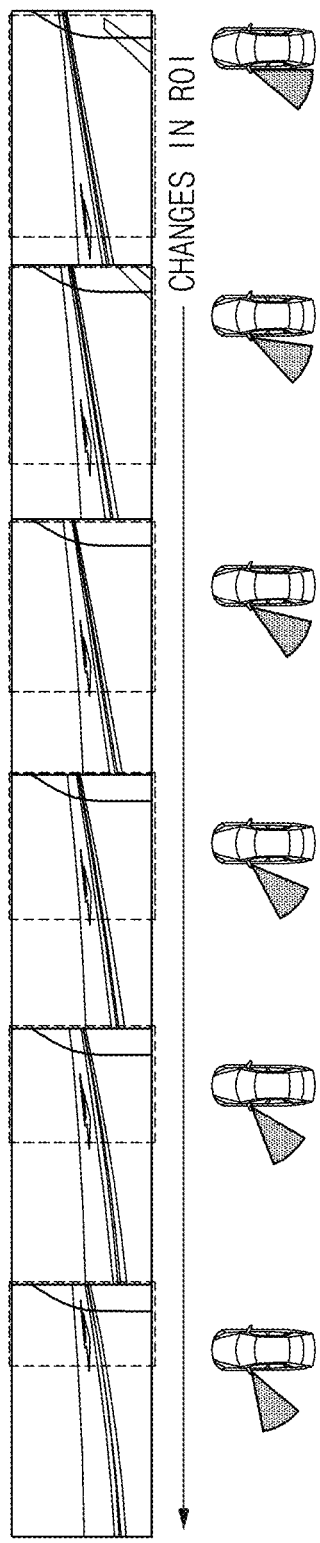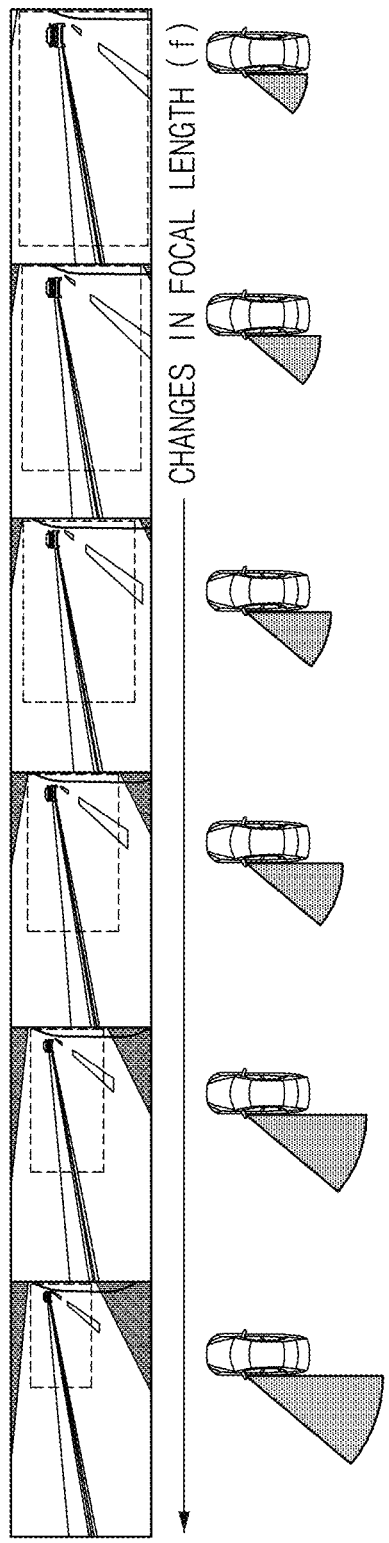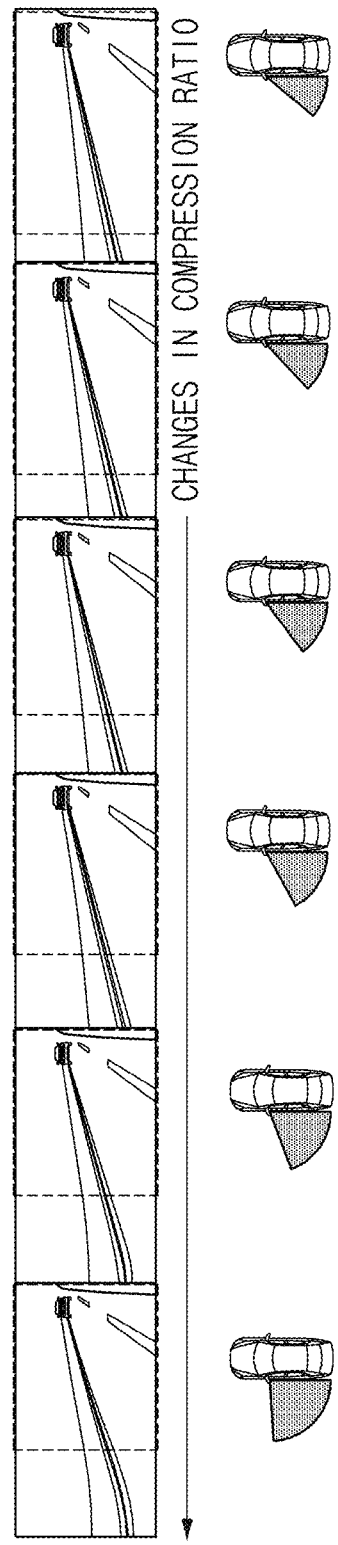
FIG. 11A  CHANGES IN ROI
FIG. 11B  CHANGES IN FOCAL LENGTH (f)
FIG. 11C  CHANGES IN COMPRESSION RATIO

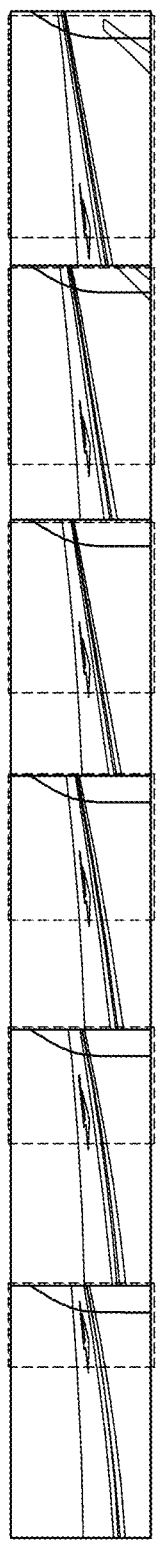
FIG. 12A CHANGES IN ROI
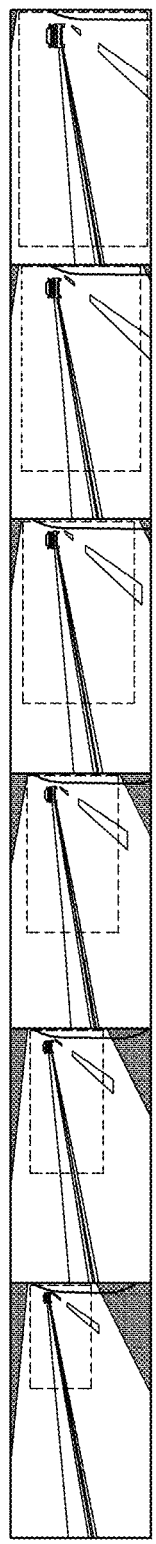
FIG. 12B CHANGES IN FOCAL LENGTH (f)
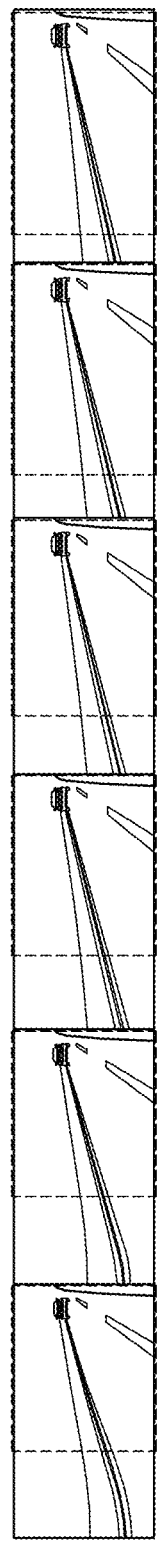
FIG. 12C CHANGES IN COMPRESSION RATIO

NORMAL VIEW

CHANGE IN ROI VIEW

CHANGES IN COMPRESSION
RATIO VIEW

CHANGES IN FOCAL LENGTH VIEW

IMAGE CONVERSION DEVICE

CROSS-REFERENCE TO RELATED APPLICATION

This application is based on and claims the benefit of priority to Korean Patent Application No. 10-2017-0057350, filed on May 8, 2017, in the Korean Intellectual Property Office, the disclosure of which is incorporated herein in its entirety by reference.

TECHNICAL FIELD

The present disclosure relates to an image conversion device and, more particularly, to an image conversion device by which an image is converted to include a blind spot according to driving environment.

BACKGROUND

Generally, side view mirrors that protrude from left and right sides of a vehicle allow a driver within the vehicle to view and identify a situation or surrounding in areas behind and to the sides of the vehicle. However, these mirrors may reduce driving performance of the vehicle due to increased air friction during high speed driving, and generate a vortex at the ends thereof to increase driving noise. Accordingly, both sides of the vehicle may be provided with side cameras by which the areas behind and to the sides of the vehicle are capable of being monitored. However, the side cameras may cover a limited range, and thus a blind spot unable of being monitored by the side cameras may be generated. Therefore, the driver may not be aware of a situation in the blind spot, thus causing a potential increase in accidents.

FIGS. 1A to 1C illustrate a blind spot generated when a vehicle is driving on a multilane road, and FIG. 2 illustrates a blind spot generated in a section of a multilane road where lanes merge according to the related art.

In FIG. 1A, a subject vehicle is driving in a first lane, while the other vehicle is driving in a third lane. In FIG. 1B, the subject vehicle and the other vehicle are trying to change to the same lane. In this case, a driver of the subject vehicle may check only the areas behind and to the side of the vehicle (see ① in FIG. 1B). Since the other vehicle is located in a blind spot of the subject vehicle, the driver of the subject vehicle is not capable of recognizing the other vehicle. Therefore, as illustrated in FIG. 1C, there is a risk of collision between the subject vehicle and the other vehicle (e.g., the surrounding vehicle, rear vehicle, or the like).

As illustrated in FIG. 2, a driver of each vehicle may only be capable of checking the areas behind and to the side of the vehicle (see ① in FIG. 2) in a merging section. In this case, vehicles located in areas outside of area ①, that is, in blind spots, are not capable of being recognized, and this may lead to an accident. In addition, it may be difficult to check a situation in a blind spot when a vehicle is driving at night (e.g., during poor lighting conditions). Accordingly, a sensor may be mounted within the vehicle to detect an object in the blind spot, and thus, the driver may be able to recognize a situation in the blind spot in advance. However, this technique requires a separate sensor to be mounted within the vehicle, and an error may occur in sensor value measurement due to the influence of external environments such as deteriorating weather conditions and the characteristics of the sensor itself.

SUMMARY

The present disclosure provides an image conversion device providing an image that is converted to include a blind spot, thereby preventing the occurrence of an accident that may be caused due to a situation in a blind spot unable to be observed by a driver.

According to an aspect of the present disclosure, an image conversion device may include: a driving environment recognition unit including an imaging device (e.g., a camera, video camera, or the like) configured to acquire a base image of areas behind and to the side of a subject vehicle and a sensor configured to sense a driving environment behind and to the side of the subject vehicle; a display unit configured to display the base image of the areas behind and to the side of the subject vehicle; a navigation unit configured to provide information regarding a location of the subject vehicle; and a controller configured to determine whether or not a blind spot is created in the driving environment based on information acquired from the driving environment recognition unit and the navigation unit, convert the base image into an image including the blind spot to generate the converted image, and operate the display unit to display the converted image.

The display unit may include a cluster or an audio video navigation (AVN). The controller may be configured to determine that the blind spot is created when the subject vehicle is trying to change a lane and the other vehicle is trying to enter the same lane as the subject vehicle. The controller may further be configured to determine that the blind spot is created when the subject vehicle or the other vehicle merges with traffic at a bottleneck. The controller may be configured to operate the display unit to display a range of the converted image from a point at which a merging road is recognized from a main road on which the subject vehicle is driving to a point at which the main road and the merging road merge when the other vehicle merges with traffic at the bottleneck.

The range of the converted image may be changed based on a relative location of the subject vehicle with respect to the merging road for both the main road and the merging road to be included. The controller may be configured to operate the display unit to display a range of the converted image from a point at which a main road is recognized from a merging road on which the subject vehicle is driving to a point at which the main road and the merging road merge when the subject vehicle merges with traffic at the bottleneck. The range of the converted image may be changed based on a relative location of the subject vehicle with respect to the main road for both the main road and the merging road to be included.

Additionally, the controller may be configured to determine that the blind spot is created when the subject vehicle is driving at night, in a tunnel, or in bad weather (e.g., rain, snow, or the like). The controller may be configured to generate the converted image by changing regions of interest (ROIs) according to areas in which the blind spot is created. The converted image may include an image that is converted to include an area spaced apart from the rear of a vehicle body in a clockwise or counterclockwise direction in relation to a sideview mirror. The converted image may include a boundary line with respect to a position of a vehicle body, and the boundary line may be darkened as a degree of distance from the rear of the vehicle body in a clockwise or counterclockwise direction in relation to a sideview mirror is reduced, and be displayed transparently as the degree of distance is increased.

The controller may be configured to generate the converted image by changing a focal length of a virtual camera according to areas in which the blind spot is created. The controller may further be configured to generate the converted image by reducing the focal length and zooming out or by lengthening the focal length and zooming in. The converted image may include an image that is extended in a direction toward the rear of a vehicle body. The controller may be configured to generate the converted image by changing a compression ratio of a virtual camera according to areas in which the blind spot is created.

The converted image may include an image that is converted by increasing or decreasing the compression ratio to include an area behind a vehicle body and an area to the side of the vehicle body. The display unit may be configured to display the converted image together with the base image. The display unit may further be configured to display a conversion viewing area of a vehicle body icon. The conversion viewing area may represent a top view of the converted image. The display unit may also be configured to display a base viewing area of the vehicle body icon. The base viewing area may represent a top view of the base image. The display unit may be configured to display a conversion viewing area and a base viewing area of a vehicle body icon in an image in which the converted image and the base image are displayed. The conversion viewing area may represent a top view of the converted image, and the base viewing area may represent a top view of the base image.

BRIEF DESCRIPTION OF THE DRAWINGS

The above and other objects, features, and advantages of the present disclosure will be more apparent from the following detailed description taken in conjunction with the accompanying drawings:

FIGS. 11A and 11C illustrate a method of displaying a converted image according to another exemplary embodiment of the present disclosure;

FIGS. 12A and 12C illustrate a method of displaying a converted image according to another exemplary embodiment of the present disclosure;

DETAILED DESCRIPTION

Figure 1A:
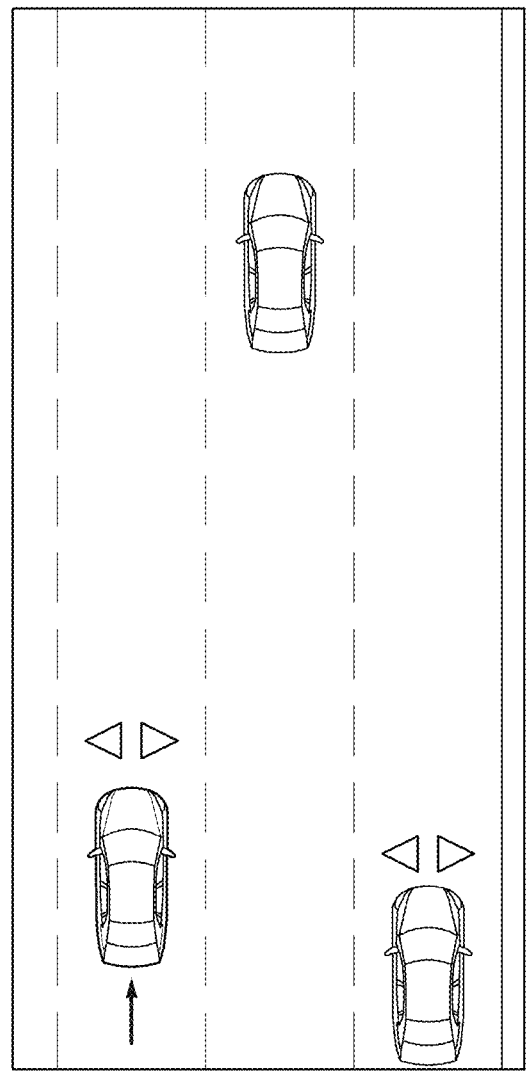
FIGS. 1A to 1C illustrate a blind spot generated when a vehicle is driving on a multilane road according to the related art.
Figure 1B:
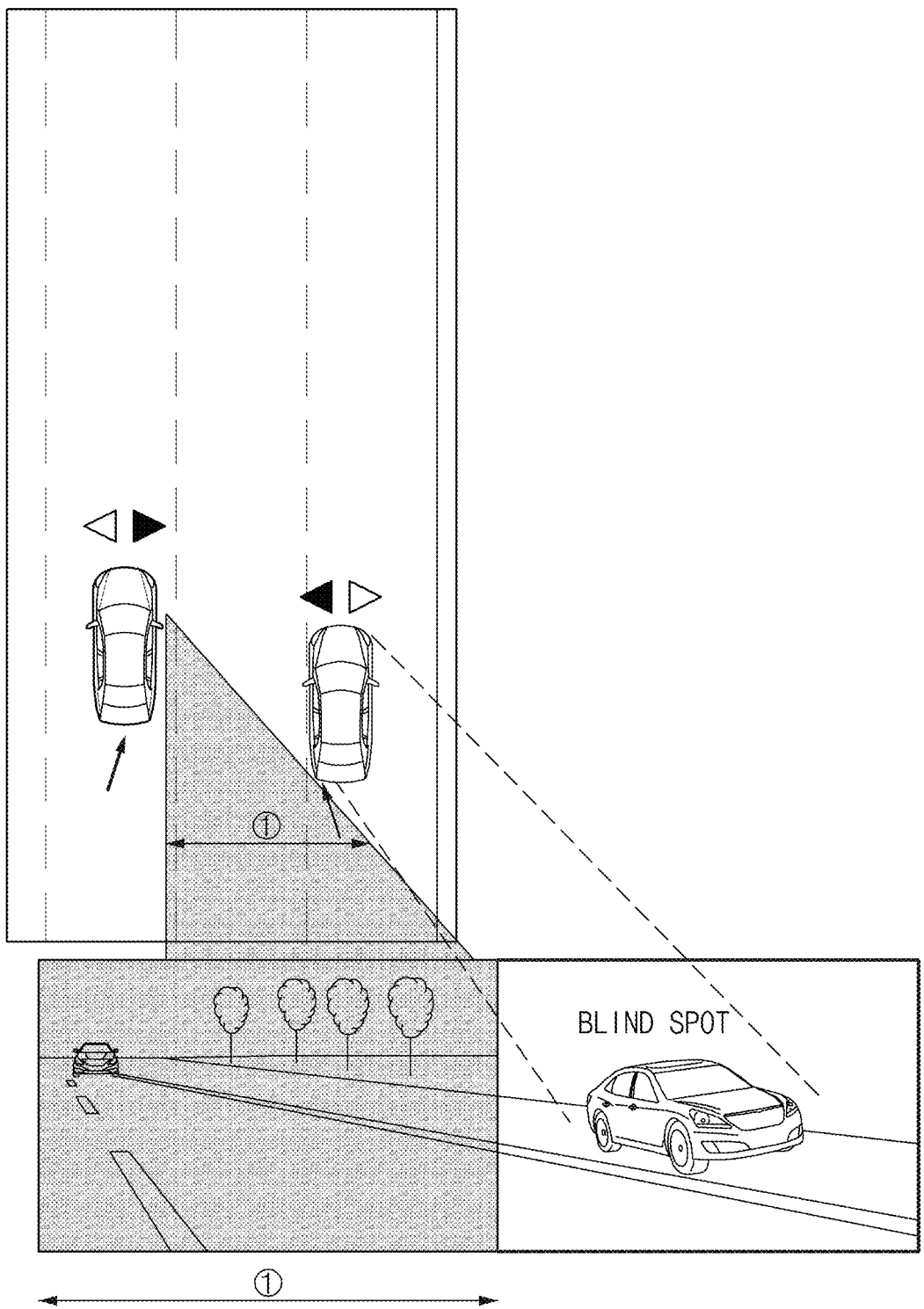
Figure 1C:
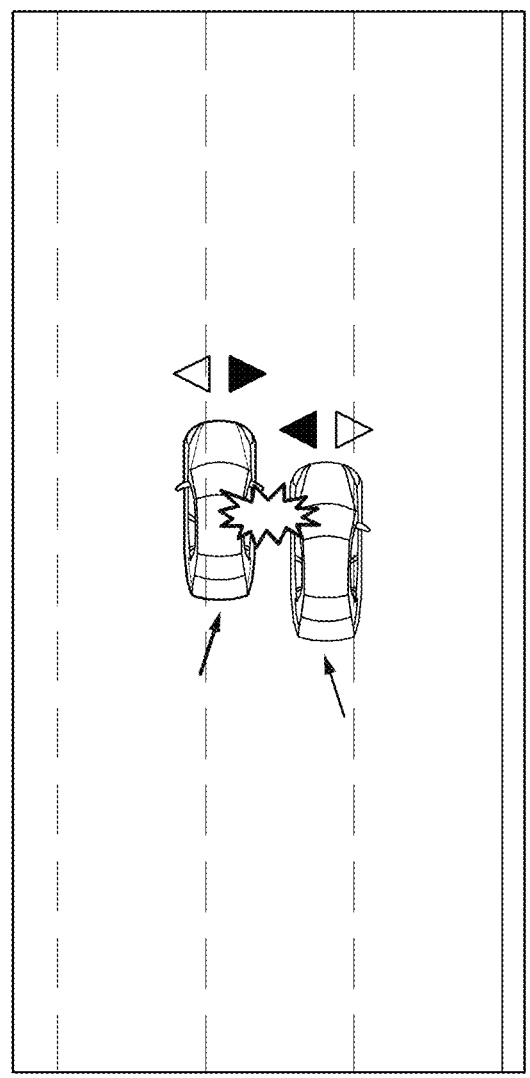
Figure 2:
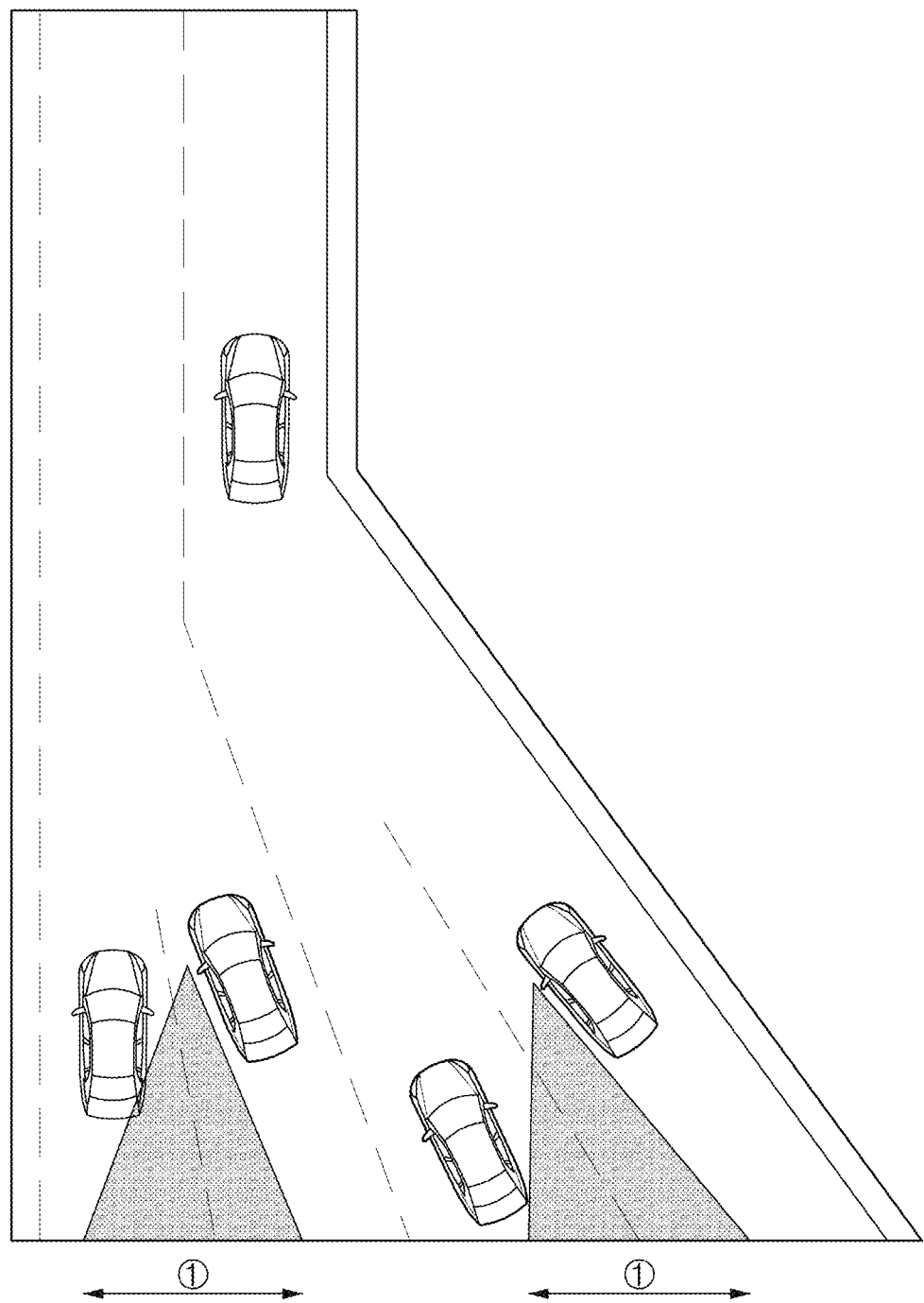
FIG. 2 illustrates a blind spot generated in a section of a multilane road where lanes merge according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 3:
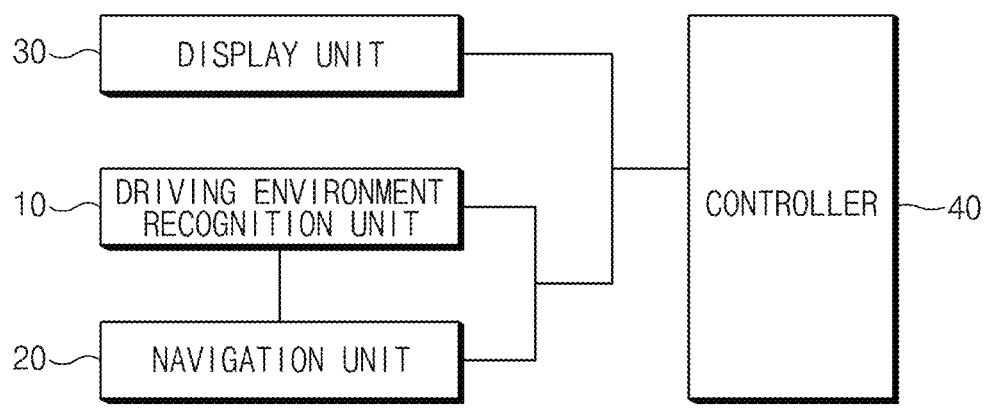
FIG. 3 illustrates the configuration of an image conversion device, according to exemplary embodiments of the present disclosure.

FIG. 3 illustrates the configuration of an image conversion device, according to exemplary embodiments of the present disclosure. As illustrated in FIG. 3, the image conversion device, according to exemplary embodiments of the present disclosure, may include a driving environment recognition unit 10, a display unit 20, a navigation unit 30, and a controller 40. The controller 40 may include a memory and a processor and may be configured to operate the other units of the device.

Particularly, the driving environment recognition unit 10 may be configured to recognize the driving environment using an imaging device (e.g., a camera, video camera, or the like) or a sensor mounted within a vehicle. The camera may be configured to acquire an image of the exterior of the vehicle, that is, an image of areas behind and to the sides of the vehicle. The camera may include a left camera and a right camera disposed on the left and right sides of the vehicle, respectively. In addition, the camera may include a front camera configured to acquire an image of an area in front of the vehicle and a rear camera configured to acquire an image of an area behind the vehicle.

The sensor may be configured to sense a neighboring vehicle, a stationary object including a roadside structure, and an oncoming vehicle traveling toward to vehicle or oncoming while traveling in an opposite lane, and calculate a distance to the sensed vehicle or object. For example, an image of a road ahead of the subject vehicle may be sensed using lane departure warning (LDW) at a viewing angle similar to an angle at which the driver is looking forward through the windshield. In addition, a vehicle or an object present in the areas behind and to the sides of the vehicle may be sensed using blind spot detection (BSD).

Additionally, the display unit 20 may be configured to receive the image of the areas behind and to the sides of the vehicle from the driving environment recognition unit 10 and display the same. The display unit 20 may also be configured to display an image that is converted to include a blind spot. Furthermore, the display unit 20 may be configured to display a map to which the current location and route of the vehicle are matched, the operating conditions of the vehicle, and other additional information. The display unit 20 may include a cluster or an audio video navigation (AVN). The navigation unit 30 may provide information regarding the location of the vehicle. Accordingly, the navigation unit 30 may be configured to store a map including information regarding the number, curvature, and conditions of lanes. The map stored in the navigation unit 30 may include a precision map including detailed information such as a lane marking state of a lane in which the vehicle is driving. In addition, the navigation unit 30 may include a global positioning system (GPS) configured to receive GPS information.

The controller 40 may be configured to determine whether a blind spot is created in the current driving environment based on the information acquired from the driving environment recognition unit 10 and the navigation unit 30. For example, the controller 40 may be configured to determine that a blind spot is created when a subject vehicle and the other vehicle are simultaneously trying or intending to enter the same lane while changing lanes, when the vehicle merges with traffic at a bottleneck, when the vehicle is driving at night (e.g., during poor lighting conditions), when the vehicle is driving in a tunnel, when the vehicle is driving in bad weather (e.g., rain, snow, and the like), and the like. In the driving environment in which a blind spot is to be created, the controller 40 may be configured to convert a base image into an image including the blind spot to generate the converted image, and operate the display unit 20 to display the converted image.

Figure 4:
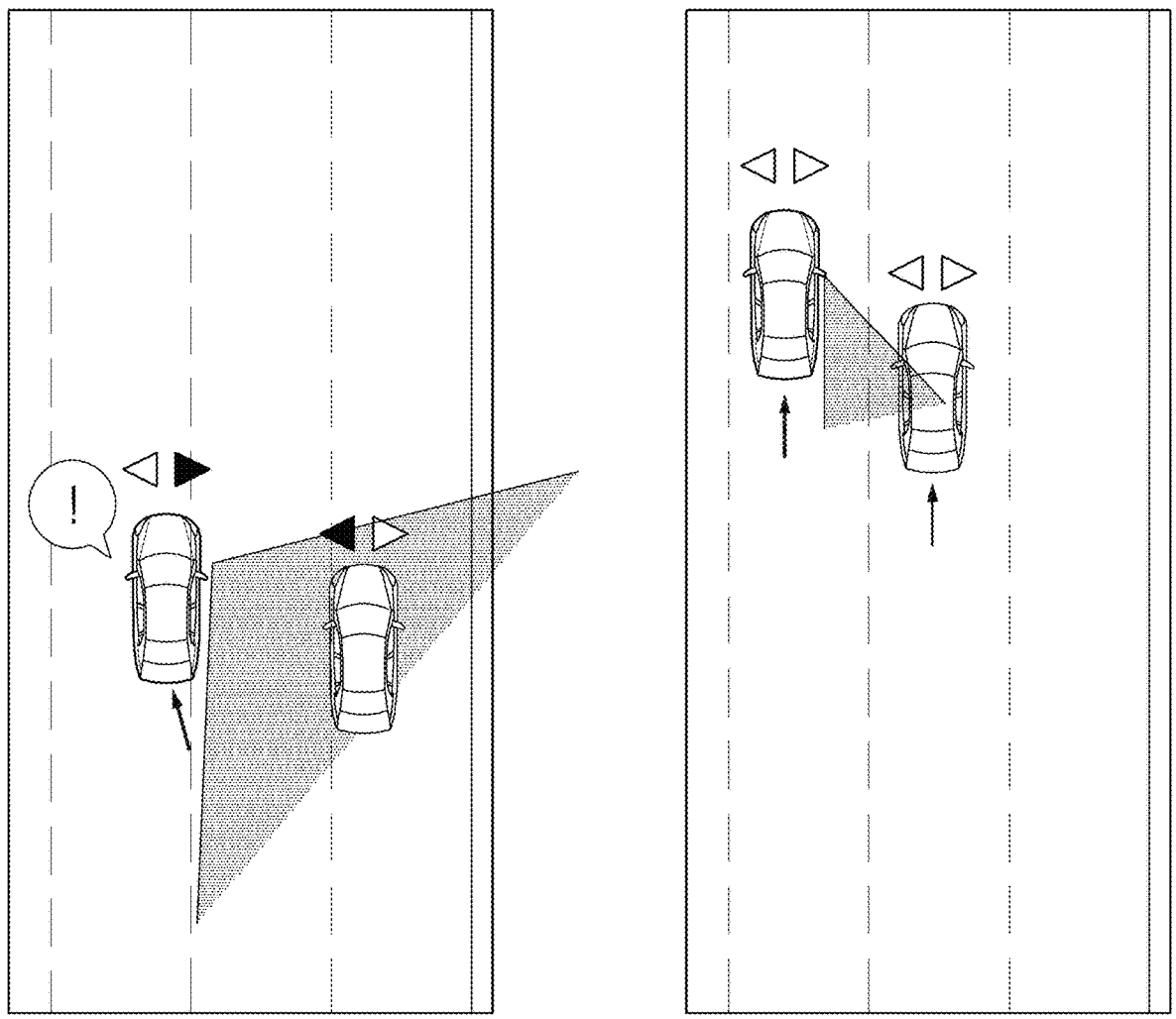
FIG. 4 illustrates that a blind spot is recognizable through image conversion, according to an exemplary embodiment of the present disclosure.

FIG. 4 illustrates that a blind spot is recognizable using image conversion, according to an exemplary embodiment of the present disclosure. In FIG. 4, when a subject vehicle changes a lane, the other vehicle (e.g., a neighboring or surrounding vehicle) is also trying to enter the same lane as the subject vehicle. According to this exemplary embodiment, it may be determined based on the information acquired from the driving environment recognition unit 10 and the navigation unit 30 that a blind spot is created in the situation illustrated in FIG. 4, and a converted image may be displayed. Particularly, the converted image refers to an image that is converted to include a blind spot. The image including the other vehicle located in the blind spot may be displayed to allow a driver to identify such a vehicle. Accordingly, the driver may cancel the lane change, and prevent a collision with the other vehicle. Meanwhile, in response to determining that the location of the other vehicle is identified without image conversion, a normal image, rather than the converted image, may be displayed. The normal image refers to an image generated based on image information acquired by the camera or the sensor mounted within the vehicle, without image conversion, in response to determining that a blind spot is not created according to driving environment.

Figure 5A:
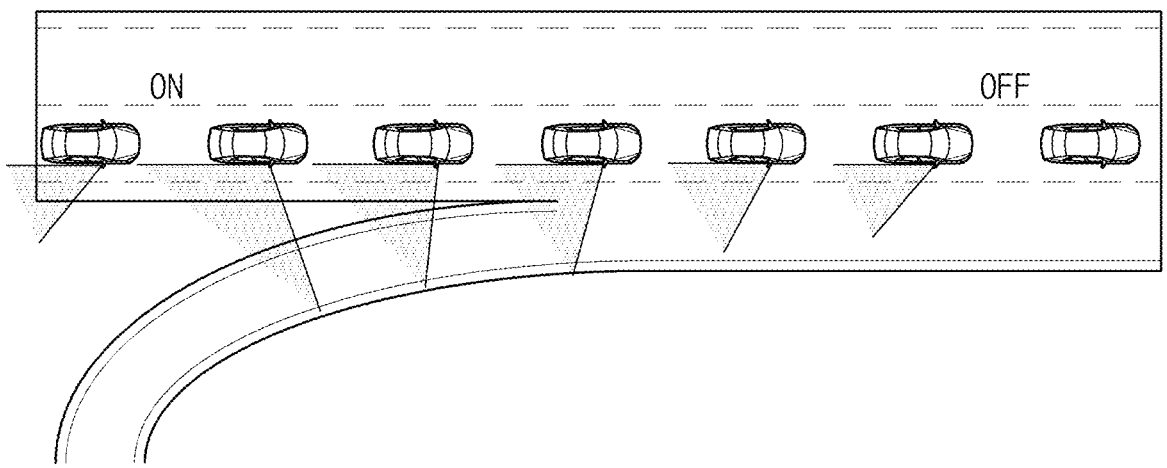
FIGS. 5A and 5B illustrate that a blind spot is recognizable through image conversion, according to another exemplary embodiment of the present disclosure.
Figure 5B:
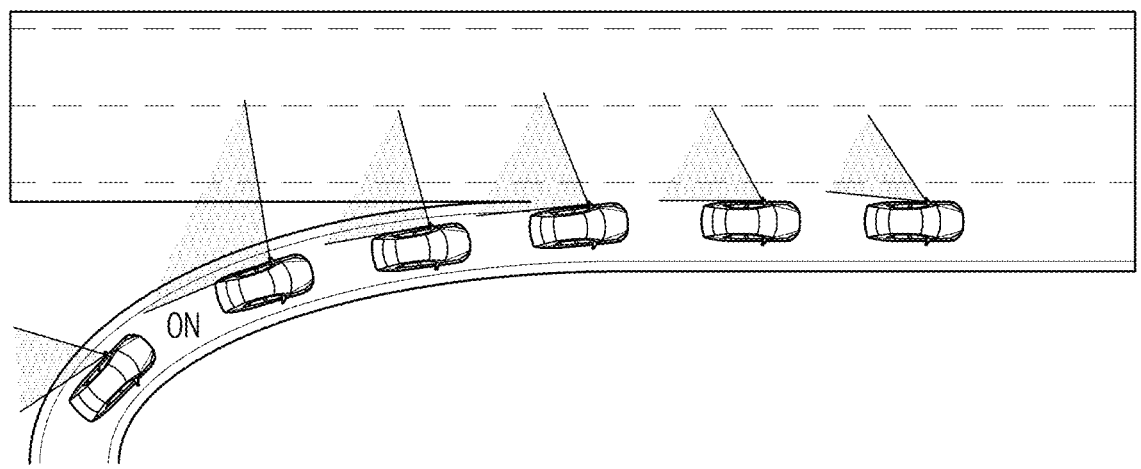

FIGS. 5A and 5B illustrate that a blind spot is recognizable using image conversion, according to another exemplary embodiment of the present disclosure. According to this exemplary embodiment, it may be determined based on the information acquired from the driving environment recognition unit 10 and the navigation unit 30 that a blind spot is created in the situations illustrated in FIGS. 5A and 5B, and respective converted images may be displayed. In addition, information regarding the curvature of a lane may be acquired.

FIG. 5A illustrates a case in which the other vehicle merges with traffic at a bottleneck. In particular, the controller 40 may be configured to set an area to be displayed as a converted image, from a point at which a merging road is recognized from a main road on which the subject vehicle is being driven to a point at which the main road and the merging road merge, and operate the display unit to display the converted image. The range of the converted image may be changed over time according to a relative location of the subject vehicle with respect to the merging road for both the main road and the merging road to be included.

FIG. 5B illustrates a case in which the subject vehicle merges with traffic at a bottleneck. In particular, an area to be displayed as a converted image may be set from a point at which a main road is recognized from a merging road on which the subject vehicle is driving to a point at which the main road and the merging road merge. The range of the converted image may be changed over time according to a relative location of the subject vehicle with respect to the main road for both the main road and the merging road to be included. Then, in response to determining that the vehicle is outside of the bottleneck and no blind spot is created, the converted image may no longer be displayed and a normal image may be displayed.

Figure 6:
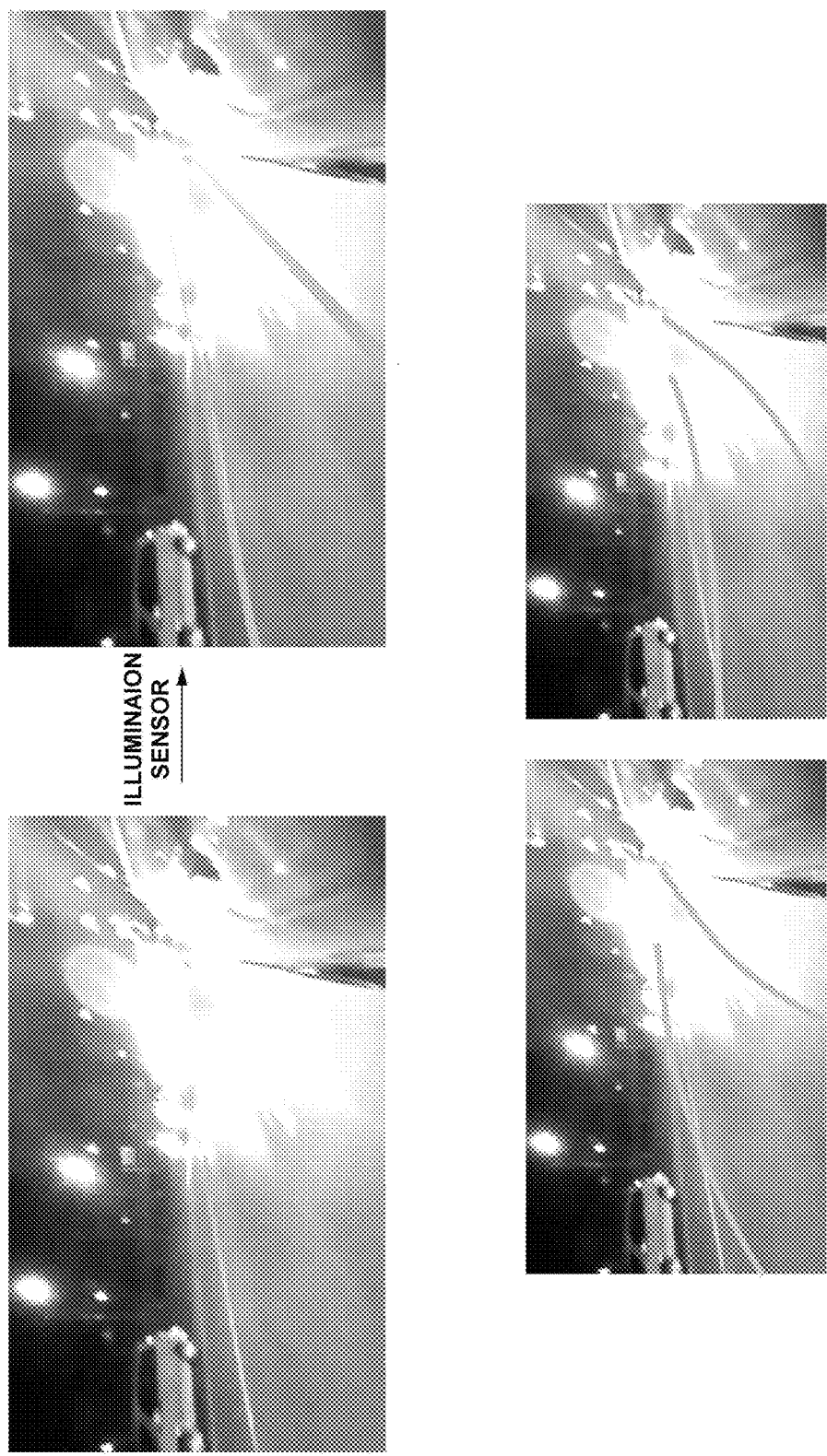
FIG. 6 illustrates that a blind spot is recognizable through image conversion, according to another exemplary embodiment of the present disclosure.

FIG. 6 illustrates that a blind spot is recognizable using image conversion, according to another exemplary embodiment of the present disclosure. FIG. 6 illustrates driving at night, in a tunnel, and in bad weather. According to this exemplary embodiment, it may be determined based on the information acquired from the driving environment recognition unit 10 and the navigation unit 30 that a blind spot is created in the cases illustrated in FIG. 6, and a converted image may be displayed.

When the identification of vehicles and lanes is difficult due to glare caused by light sources of neighboring vehicles or the like, temporary lane markings may be displayed by considering the width of a typical driving lane thus simplifying the determination of a blind spot using the displayed temporary lane markings. In addition, the creation of a blind spot may be determined more easily by displaying the driving lane as a curve based on the result of the acquired image or the amount of steering of the driver.

Figure 7:
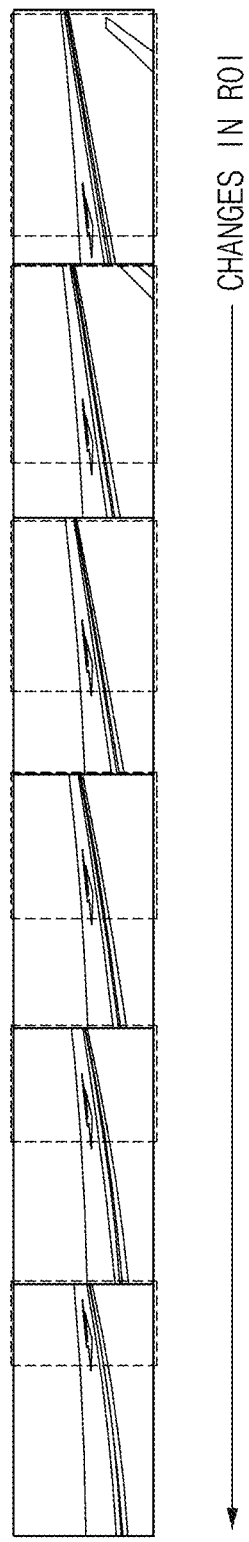
FIG. 7 illustrates a converted image according to an exemplary embodiment of the present disclosure.
Figure 8:
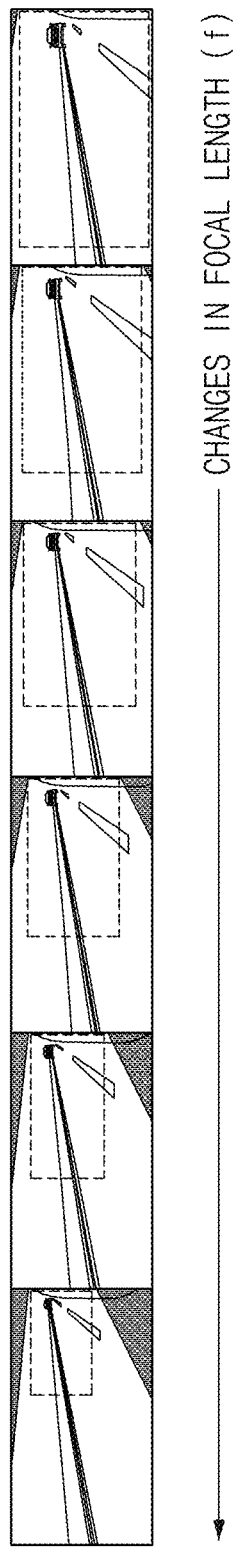
FIG. 8 illustrates a converted image according to another exemplary embodiment of the present disclosure.
Figure 9:
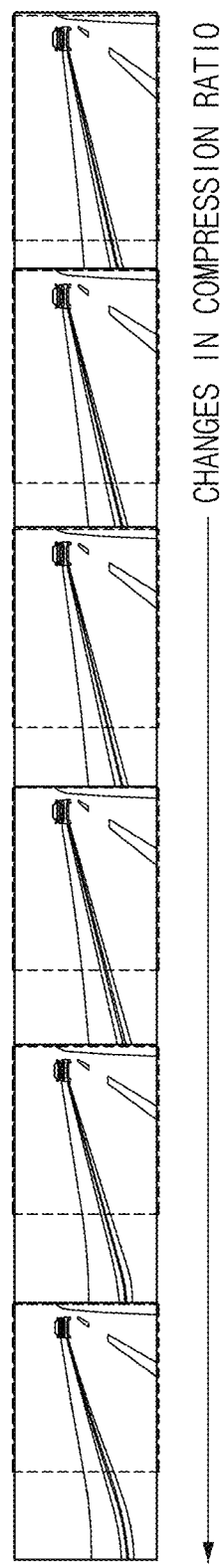
FIG. 9 illustrates a converted image according to another exemplary embodiment of the present disclosure.

FIGS. 7 to 9 illustrate examples of images that are converted to include a blind spot, according to exemplary embodiments of the present disclosure. FIG. 7 illustrates a converted image based on changes in regions of interest (ROIs). Referring to FIG. 7, to generate an image that is converted to include a blind spot, the controller 40 may be configured to convert an image by changing ROIs according to areas in which a blind spot is created, to generate the converted image. The converted image may include images that are converted according to movement of ROIs in a counterclockwise direction from the rear of a vehicle body in relation to a sideview mirror when the images are viewed from the right side to the left side in FIG. 7.

Although not shown, the converted image is not limited thereto, and the converted image may include images that are converted according to movement of ROIs in a clockwise direction from the rear of the vehicle body in relation to the sideview mirror. Thus, the leftmost image may be an image converted by changing ROI to include an area to the side of the vehicle body farthest from the rear of the vehicle body, and the rightmost image may be an image that is converted by changing ROI to include an area to the side of the vehicle body closest to the rear of the vehicle body.

The vehicle body may not appear in the images since the areas, when viewed from the right-side image to the left-side image, become more distant from the rear of the vehicle body. Therefore, the degree of distance from the rear of the vehicle body may be indicated by adjusting the transparency of a boundary line with respect to the position of the vehicle body. In other words, the boundary line may be darkened in color on the display as the degree of distance from the rear of the vehicle body in the clockwise or counterclockwise direction in relation to the sideview mirror of the vehicle is reduced, while it may be displayed transparently as the degree of distance is increased. Therefore, it may be understood that as the transparency of the boundary line with respect to the position of the vehicle body increases, the image (leftmost image) may be displayed to include the area to the side of the vehicle body farthest from the rear of the vehicle body, and as the boundary line with respect to the position of the vehicle body is darkened, the image (rightmost image) may be displayed to include the area to the side of the vehicle body closest to the rear of the vehicle body.

FIG. 8 illustrates a converted image based on changes in focal length. Referring to FIG. 8, the controller 40 may be configured to convert an image by changing a focal length of a virtual camera rather than physical parameters of an actual camera, to generate the converted image. It may be understood that the converted image may include images that are converted by reducing the focal length and zooming out to include areas relatively distant from a vehicle body when the images are viewed from the right side to the left side in FIG. 8. On the contrary, the converted image may include images that are converted by lengthening the focal length and zooming in to include areas relatively close to the vehicle body. Thus, the leftmost image may be an image that is converted to include an area farthest from the rear of the vehicle body while extending from the rear of the vehicle body in a direction toward the rear of the vehicle body, and the rightmost image may be an image that is converted to include an area closest to the rear of the vehicle body while extending from the rear of the vehicle body in the direction toward the rear of the vehicle body.

FIG. 9 illustrates a converted image based on changes in compression ratio. Referring to FIG. 9, the controller 40 may be configured to convert an image by changing a compression ratio of a virtual camera rather than physical parameters of an actual camera, to generate the converted image. It may be understood that the converted image may include images that are converted by increasing the compression ratio include areas relatively distant from a vehicle body when the images are viewed from the right side to the left side in FIG. 9. Thus, the leftmost image may be an image that is converted to include a range of areas from an area behind the vehicle body to the entirety of an area to the side of the vehicle, and the rightmost image may be an image that is converted to include a range of areas from an area behind the vehicle body to a portion of an area to the side of the vehicle.

As described above, the converted images may be displayed by adjusting the changes in the ranges of the ROIs, the focal length, and the compression ratio, based on the result of determining where the blind spot is in relation to the vehicle using the information acquired from the driving environment recognition unit or the navigation unit. The converted images in the above-described exemplary embodiments may be displayed on the display unit in various methods according to exemplary embodiments as illustrated in FIGS. 10A, 10B and 10C to 13A, 13B, 13C and 13D.

Figure 10A:
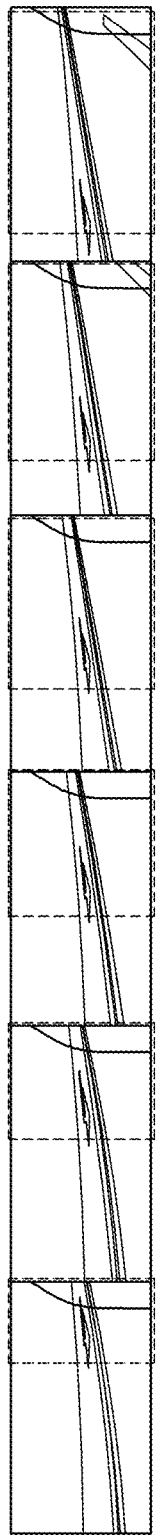
FIGS. 10A and 10C illustrate a method of displaying a converted image according to an exemplary embodiment of the present disclosure.
Figure 10B:
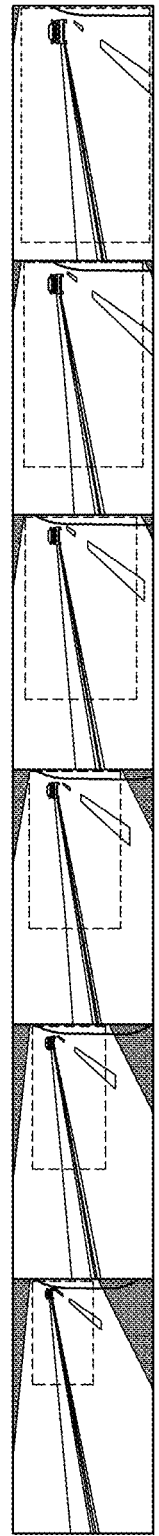
Figure 10C:
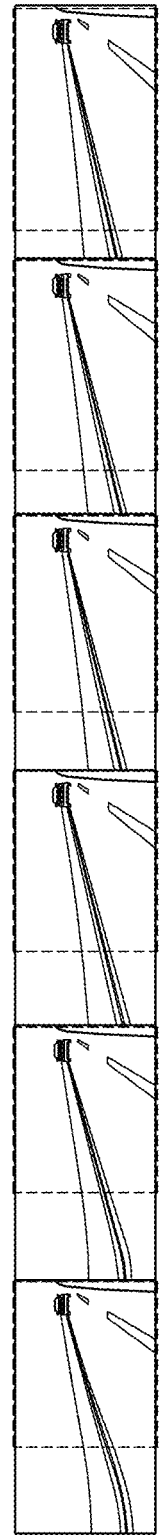

FIG. 10A and FIG. 10B illustrate a method of displaying a converted image together with a base image on a display unit. FIG. 10A illustrates a converted image that is displayed according to changes in ROIs, FIG. 10B illustrates a converted image that is displayed according to changes in a focal length of a virtual camera, and FIG. 10C illustrates a converted image that is displayed according to changes in a compression ratio of a virtual camera. In particular, a base image is indicated by a dotted line on the image, and the degree of conversion (e.g., how much the converted image is extended from the base image) may be understood from the exemplary embodiments illustrated in FIGS. 10A, 10B, and 10C. In other words, the drawings show that the converted images according to the exemplary embodiments illustrated in FIGS. 10A, 10B, and 10C are obtained by extending the base images to include a wider range of areas (blind spots) when viewed from the right side to the left side.

FIGS. 11A, 11B, and 11C illustrate a method of displaying a converted image by adding a vehicle body icon with a conversion viewing area corresponding to each converted image to the display method of FIGS. 10A, 10B and 10C. In particular, the conversion viewing area represents a top view of the converted image. For convenience of explanation, the display method may be described separately with reference to FIGS. 11A, 11B, and 11C.

When viewed from the right side to the left side, a converted image in FIG. 11A may be changed according to movement of ROIs to include a range of areas from an area behind the vehicle body to an area to the side of the vehicle body. Thus, when viewed from the right side to the left side, the conversion viewing area of the vehicle body icon may be set to include the area behind the vehicle body, and be then set to include the area to the side of the vehicle body.

When viewed from the right side to the left side, a converted image in FIG. 11B may be changed by reducing a focal length and zooming out to include a range of areas from an area close to the rear of the vehicle body to an area far from the rear of the vehicle body in a direction toward the rear of the vehicle body. Thus, when viewed from the right side to the left side, the conversion viewing area of the vehicle body icon may be set to include the area close to the rear of the vehicle body in the direction toward the rear of the vehicle body, and be then set to include the area far from the rear of the vehicle body in the direction toward the rear of the vehicle body.

When viewed from the right side to the left side, a converted image in FIG. 11C may be changed by increasing a compression ratio to include a range of areas from the rear of the vehicle body to an area to the side of the vehicle body far from the rear of the vehicle body. Thus, when viewed from the right side to the left side, the conversion viewing area of the vehicle body icon may be set to include the area to the side of the vehicle body close to the rear of the vehicle body, and be then set to include the area to the side of the vehicle body far from the rear of the vehicle body.

FIGS. 12A, 12B and 12C illustrates a method of displaying a converted image by adding a base viewing area of the vehicle body icon to the display method of FIGS. 11A, 11B and 11C. In particular, the base viewing area represents a top view of a base image. Referring to FIGS. 12A, 12B and 12C, the conversion viewing area and the base viewing area of the vehicle body icon may be compared to each other. For convenience of explanation, the display method may be described separately with reference to FIGS. 12A, 12B, and 12C.

When viewed from the right side to the left side in FIG. 12A, the converted image may be changed according to changes in ROIs such that the conversion viewing area of the vehicle body icon may be spaced apart from the base viewing area in a direction toward the side of the vehicle body. When viewed from the right side to the left side in FIG. 12B, the converted image may be changed by zooming out to extend the conversion viewing area of the vehicle body icon from the base viewing area in a direction toward the rear of the vehicle body. When viewed from the right side to the left side in FIG. 12C, the converted image may be changed by increasing a compression ratio to extend the conversion viewing area of the vehicle body icon from the base viewing area in the direction toward the side of the vehicle body while including the base viewing area.

According to another exemplary embodiment of the present disclosure, as illustrated in FIGS. 13A, 13B, 13C and 13D a base image and/or a converted image may be displayed in a manner such that a conversion viewing area and a base viewing area of a vehicle body icon are displayed together in the image on the display unit. For convenience of explanation, the display method may be described separately with reference to FIGS. 13A to 13D.

Figure 13A:
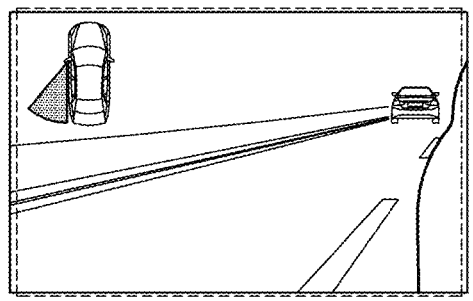
FIGS. 13A and 13D illustrate a method of displaying a converted image according to another exemplary embodiment of the present disclosure.
Figure 13B:
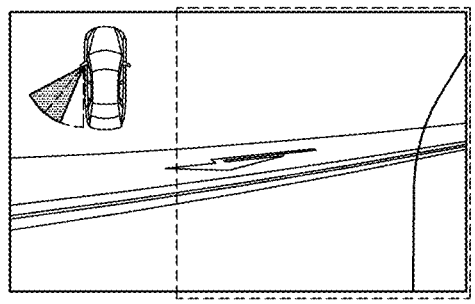

As illustrated in FIG. 13A, the base image together with the conversion viewing area and the base viewing area of the vehicle body icon may be displayed. FIG. 13B illustrates a converted image obtained by changing a ROI, and the conversion viewing area of the vehicle body icon is shown to be spaced apart from the base viewing area in the direction toward the side of the vehicle body. Thus, a driver may be capable of checking an area spaced apart in the direction toward the side of the vehicle body. The fact that the conversion viewing area of the vehicle body icon is spaced apart from the base viewing area in the direction toward the side of the vehicle body may be seen from the fact that a boundary line of the vehicle body is displayed more transparently than a boundary line displayed in the base image.

Figure 13C:
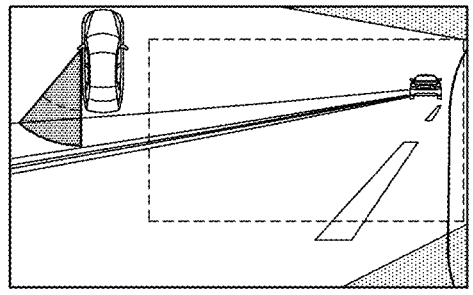
Figure 13D:
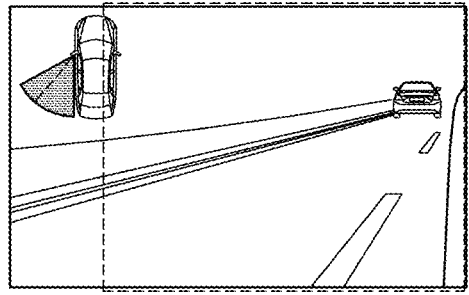

FIG. 13C illustrates a converted image that is obtained by zooming out, and the conversion viewing area of the vehicle body icon is extended from the base viewing area in the direction toward the rear of the vehicle body. Thus, the driver may be capable of checking a range of areas further from the vehicle in the direction toward the rear of the vehicle body. FIG. 13D illustrates a converted image that is obtained by increasing a compression ratio, and the conversion viewing area of the vehicle body icon is extended from the base viewing area in the direction toward the side of the vehicle body. Thus, the driver may be capable of checking an area to the side of the vehicle body as well as an area behind the vehicle body.

As described above, the driver may more easily identify the range of areas around the vehicle body included in the image displayed on the display unit from the converted image and the conversion viewing area of the vehicle body icon. Furthermore, the controller may be configured to determine the creation of the blind spot, adjust the range of the converted image (spaced apart from or extending from the vehicle body) when there is another vehicle or an obstacle in the blind spot, and allow the driver to recognize the vehicle or obstacle in the blind spot. Accordingly, the vehicle may be operated to avoid a collision with the other vehicle or obstacle.

Figure 14:
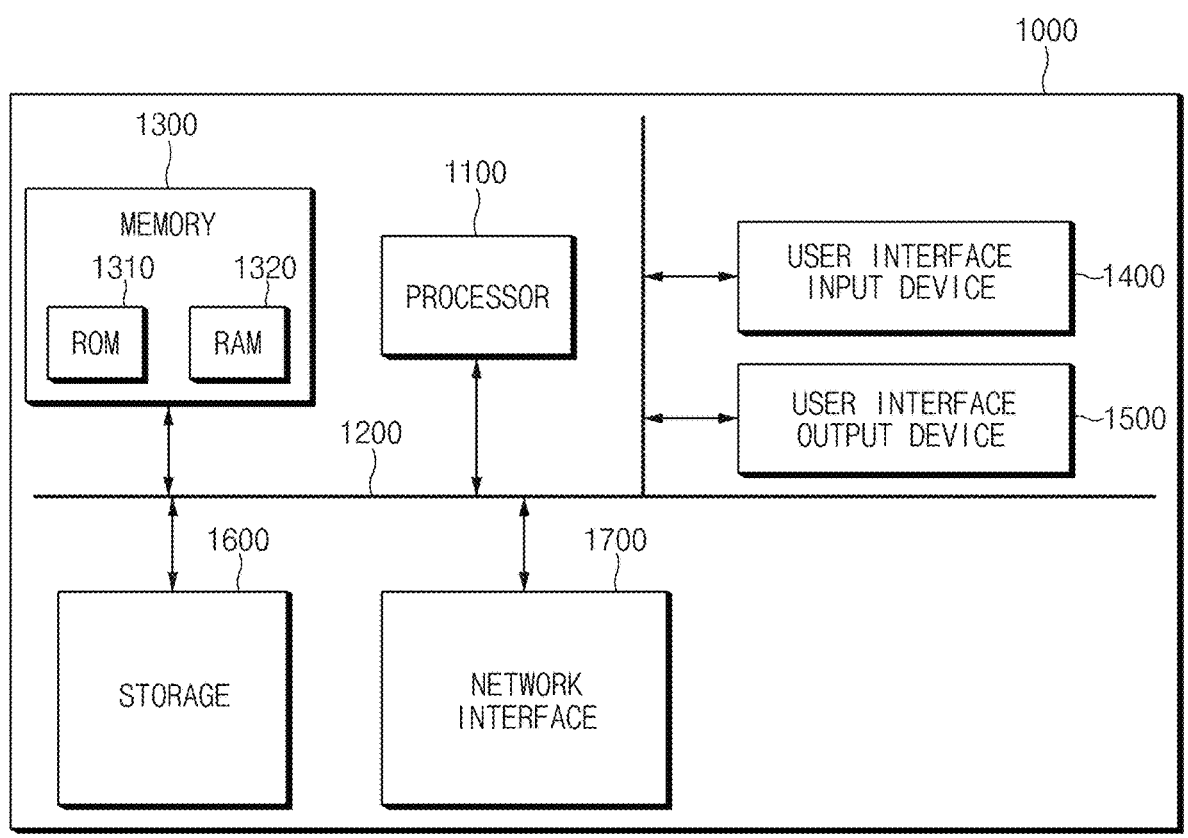
FIG. 14 illustrates the configuration of a computing system by which an image conversion method according to exemplary embodiments of the present disclosure is executed.

FIG. 14 illustrates the configuration of a computing system by which an image conversion method according to exemplary embodiments of the present disclosure is executed. Referring to FIG. 14, a computing system 1000 may include at least one processor 1100, a bus 1200, a memory 1300, a user interface input device 1400, a user interface output device 1500, a storage 1600, and a network interface 1700, wherein these elements are connected via the bus 1200. The processor 1100 may be a central processing unit (CPU) or a semiconductor device configured to process commands stored in the memory 1300 and/or the storage 1600. The memory 1300 and the storage 1600 may include various types of volatile or non-volatile storage media. For example, the memory 1300 includes a read only memory (ROM) and a random access memory (RAM).

Therefore, the steps of the method or algorithm described in connection with the exemplary embodiments disclosed herein may be implemented directly by a hardware module or a software module that is executed by the processor 1100, or a combination of both. The software module may reside in a storage medium, i.e., the memory 1300 and/or the storage 1600, such as RAM, a flash memory, ROM, an erasable programmable read-only memory (EPROM), an electrically erasable programmable read-only memory (EEPROM), a register, a hard disk, a removable disk, and a CD-ROM. The exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. Alternatively, the processor 1100 and the storage medium may reside as individual components in a user terminal.

As set forth above, the present inventive concept provides an effect of improving driving stability by recognizing driving environment, determining whether a blind spot is created, converting a base image into an image of an area required to be checked by the driver, and displaying the converted image to thus allow the vehicle to be operated to avoid a collision with objects or vehicles located in the blind spot.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An image conversion device, comprising:
a driving environment recognition unit including a camera configured to acquire a base image of areas behind and to a side of a subject vehicle and a sensor configured to sense a driving environment behind and to the side of the subject vehicle;
a display unit configured to display the base image of the areas behind and to the side of the subject vehicle;
a navigation unit configured to provide information regarding a location of the subject vehicle; and
a controller configured to determine whether a blind spot is created in the driving environment based on information acquired from the driving environment recognition unit and the navigation unit, convert the base image into an image including the blind spot to generate the converted image, and operate the display unit to output the converted image,
wherein the converted image includes a boundary line corresponding to a subject vehicle body, and the controller adjusts a transparency of the boundary line corresponding to the subject vehicle body according to a degree to which an area included in the converted image is separated from the subject vehicle body, and
wherein the boundary line is darkened in color as a degree of distance from the rear of the vehicle body in a clockwise or counterclockwise direction in relation to a sideview mirror is reduced, and is displayed transparently as the degree of distance is increased.

2. The image conversion device according to claim 1, wherein the display unit includes a cluster or an audio video navigation (AVN).

3. The image conversion device according to claim 1, wherein the controller is configured to determine that the blind spot is created when the subject vehicle is trying to change a lane and a neighboring vehicle is trying to enter a same lane of the subject vehicle.

4. The image conversion device according to claim 1, wherein the controller is configured to determine that the blind spot is created when the subject vehicle or a neighboring vehicle merges with traffic at a bottleneck.

5. The image conversion device according to claim 4, wherein the controller is configured to operate the display unit to display a range of the converted image from a point at which a merging road is recognized from a main road on which the subject vehicle is driving to a point at which the main road and the merging road merge when the neighboring vehicle merges with traffic at the bottleneck.

6. The image conversion device according to claim 5, wherein the range of the converted image is changed according to a relative location of the subject vehicle with respect to the merging road for both the main road and the merging road to be included.

7. The image conversion device according to claim 4, wherein the controller is configured to operate the display unit to display a range of the converted image from a point at which a main road is recognized from a merging road on which the subject vehicle is driving to a point at which the main road and the merging road merge when the subject vehicle merges with traffic at the bottleneck.

8. The image conversion device according to claim 7, wherein the range of the converted image is changed according to a relative location of the subject vehicle with respect to the main road for both the main road and the merging road to be included.

9. The image conversion device according to claim 1, wherein the controller is configured to determine that the blind spot is created when the subject vehicle is driving at night, in a tunnel, or in bad weather.

10. The image conversion device according to claim 1, wherein the controller is configured to generate the converted image by changing regions of interest (ROIs) according to areas in which the blind spot is created.

11. The image conversion device according to claim 10, wherein the converted image includes an image that is converted to include an area spaced apart from the rear of a vehicle body in a clockwise or counterclockwise direction in relation to a sideview mirror.

12. The image conversion device according to claim 1, wherein the controller is configured to generate the converted image by changing a focal length of a virtual camera according to areas in which the blind spot is created.

13. The image conversion device according to claim 12, wherein the controller is configured to generate the converted image by reducing the focal length and zooming out or by lengthening the focal length and zooming in.

14. The image conversion device according to claim 12, wherein the converted image includes an image extended in a direction toward the rear of a vehicle body.

15. The image conversion device according to claim 1, wherein the controller is configured to generate the converted image by changing a compression ratio of a virtual camera according to areas in which the blind spot is created.

16. The image conversion device according to claim 15, wherein the converted image includes an image that is converted by increasing or decreasing the compression ratio to include an area behind a vehicle body and an area to the side of the vehicle body.

17. The image conversion device according to claim 1, wherein the display unit is configured to display the converted image together with the base image.

18. The image conversion device according to claim 17, wherein the display unit is configured to display a conversion viewing area of a vehicle body icon.

19. The image conversion device according to claim 18, wherein the conversion viewing area represents a top view of the converted image.

20. The image conversion device according to claim 17, wherein the display unit is configured to display a base viewing area of the vehicle body icon.

21. The image conversion device according to claim 20, wherein the base viewing area represents a top view of the base image.

22. The image conversion device according to claim 1, wherein the display unit is configured to display a conversion viewing area and a base viewing area of a vehicle body icon in an image in which the converted image and the base image are displayed.

23. The image conversion device according to claim 22, wherein the conversion viewing area represents a top view of the converted image, and the base viewing area represents a top view of the base image.

* * * * *